US006819521B2

(12) United States Patent
Ho et al.

(10) Patent No.: US 6,819,521 B2
(45) Date of Patent: Nov. 16, 2004

(54) REPEATED RUNOUT POSITION ERROR COMPENSATION IN A DISC DRIVE SERVO SYSTEM

(75) Inventors: Hai T. Ho, Broomfield, CO (US); Justin Won, Longmont, CO (US); Mirmehdi L. Abrishamchian, Marlborough, MA (US); Gregory A. Campbell, Lyons, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 384 days.

(21) Appl. No.: 09/877,053

(22) Filed: Jun. 8, 2001

(65) Prior Publication Data

US 2002/0012191 A1 Jan. 31, 2002

Related U.S. Application Data

(60) Provisional application No. 60/210,646, filed on Jun. 9, 2000.

(51) Int. Cl.[7] .............................................. G11B 5/596
(52) U.S. Cl. .................................................. 360/77.04
(58) Field of Search ........................ 360/77.04, 77.02, 360/75, 77.11, 294.4, 78.05

(56) References Cited

U.S. PATENT DOCUMENTS

| 4,477,755 A | 10/1984 | Rickert |
| 4,536,809 A | 8/1985 | Sidman |
| 4,594,622 A | 6/1986 | Wallis |
| 4,628,379 A | 12/1986 | Andrews, Jr. et al. |
| 4,894,599 A | 1/1990 | Ottesen et al. |
| 4,965,501 A | 10/1990 | Hashimoto |
| 5,189,571 A | 2/1993 | Murphy et al. |
| 5,325,247 A | 6/1994 | Ehrlich et al. |
| 5,539,714 A | 7/1996 | Andrews, Jr. et al. |
| 5,550,685 A | 8/1996 | Drouin |

(List continued on next page.)

OTHER PUBLICATIONS

Alexei H. Sacks, Marc Bodson and William Messner; "Advanced Methods for Repeatable Runout Compensation"; *IEEE Transactions on Magnetics*; Mar., 1995; pp. 1031–1036; vol. 31, No. 2; IEEE; Pittsburgh, PA, US.

*Primary Examiner*—David Hudspeth
*Assistant Examiner*—Fred F. Tzeng
(74) *Attorney, Agent, or Firm*—Fellers, Snider, et al.

(57) ABSTRACT

An apparatus and method for compensating repeated runout position error in a disc drive data handling system having an actuator assembly which supports a head adjacent a recording surface. A servo loop generates a position error signal (PES) to control the position of the head. A digital filter is configured to place a notch in an error sensitivity function relating the PES to the repeated runout position error, with the notch being nominally centered at a frequency of rotation of the recording surface. The filter thereafter filters the PES to generate compensation signals that are injected into the servo loop. At least selected filter parameters are determined by measuring the frequency response of the servo loop and used as a priori knowledge to produce a loop matching effect that results in a consistent convergence rate for any targeted frequency to be filtered.

18 Claims, 4 Drawing Sheets

U.S. PATENT DOCUMENTS

| | | | |
|---|---|---|---|
| 5,608,586 A | | 3/1997 | Sri-Jayantha et al. |
| 5,610,487 A | | 3/1997 | Hutsell |
| 5,646,797 A | | 7/1997 | Kadlec et al. |
| 5,661,615 A | | 8/1997 | Waugh et al. |
| 5,691,617 A | | 11/1997 | Funches |
| 5,801,905 A | | 9/1998 | Schirle et al. |
| 5,875,066 A | * | 2/1999 | Ottesen .................... 360/77.11 |
| 5,901,009 A | | 5/1999 | Sri-Jayantha et al. |
| 5,923,491 A | | 7/1999 | Kisaka et al. |
| 5,926,338 A | | 7/1999 | Jeon et al. |
| 5,995,317 A | * | 11/1999 | Ottesen .................... 360/77.04 |
| 6,049,441 A | * | 4/2000 | Ottesen .................... 360/77.04 |
| 6,069,764 A | | 5/2000 | Morris et al. |
| 6,088,186 A | | 7/2000 | Carlson |
| 6,097,565 A | | 8/2000 | Sri-Jayantha et al. |
| 6,122,125 A | | 9/2000 | Clare et al. |
| 6,141,175 A | | 10/2000 | Nazarian et al. |
| 6,166,876 A | | 12/2000 | Liu |
| 6,310,742 B1 | * | 10/2001 | Nazarian et al. ......... 360/77.04 |
| 6,417,982 B1 | * | 7/2002 | Ottesen et al. ........... 360/77.02 |
| 6,437,936 B1 | * | 8/2002 | Chen et al. .............. 360/77.04 |
| 6,563,663 B1 | * | 5/2003 | Bi et al. ................... 360/77.04 |
| 6,563,665 B1 | * | 5/2003 | Ell ........................... 360/78.05 |
| 6,574,065 B1 | * | 6/2003 | Sri-Jayantha et al. ......... 360/75 |
| 6,583,964 B1 | * | 6/2003 | Huang et al. ............ 360/294.4 |
| 6,590,734 B1 | * | 7/2003 | Ell ........................... 360/78.05 |
| 6,606,215 B1 | * | 8/2003 | Eddy et al. .............. 360/77.04 |

* cited by examiner

REPEATED RUNOUT POSITION ERROR COMPENSATION IN A DISC DRIVE SERVO SYSTEM

RELATED APPLICATIONS

This application claims priority to Provisional Application No. 60/210,646 filed Jun. 9, 2000.

FIELD THE INVENTION

This invention relates generally to the field of data handling devices, and more particularly, but not by way of limitation, to a method and apparatus for improving servo performance in a disc drive by reducing the effects of repeated runout head position error.

BACKGROUND

Disc drives are data handling systems used to store and retrieve digital data. A typical disc drive comprises one or more rigid magnetic storage discs which are arranged about a spindle motor for rotation at a constant high speed. A corresponding array of read/write heads are provided to transfer data between tracks defined on the disc surfaces and a host device (such as a computer) in which the disc drive is mounted.

The heads are mounted to a rotary actuator assembly and are controllably positioned adjacent the tracks by a closed loop servo control system. The actuator includes an actuator motor (such as a voice coil motor, VCM) and one or more actuator arms which support the heads over the disc surfaces. The servo control system applies currents to the VCM to move the heads in response to detected and estimated positions of the heads as well as command inputs indicating desired positions of the heads. During operation, the servo control system generates a position error signal (PES) which provides an indication of the intra-track location of a selected head with respect to an associated track over which the head is disposed.

Servo control systems are designed to provide stable positional control in the presence of different types of disturbances which can adversely impact the ability of the disc drive to access and follow a particular track. Such disturbances include externally generated vibrations which are applied to the disc drive housing from the environment in which the disc drive is mounted, internally generated vibrations induced by the rapid movement of the actuator assembly during a seek operation as a head is moved from one track to another, errors in the locations of servo data used to define the tracks which can introduce small, yet significant, track eccentricities, spindle motor vibrations at bearing cage frequencies, and disc slippage which can introduce track eccentricity at the frequency of disc rotation. Such disturbances can be categorized as either repeatable or nonrepeatable runout errors (RRO and NRRO, respectively), and are typically manifested as frequency components of the PES.

Generally speaking, RRO errors are repetitive in nature (usually over each disc revolution) whereas NRRO errors occur more or less randomly over time. The prior art is replete with various approaches to compensating for each of these types of disturbance. Clearly, such disturbances become increasingly adverse as track densities and data transfer rates increase. Disturbances that may have only had a minimal effect upon servo performance on drives just a few years ago can now have a significant impact upon drives of the present generation.

Of particular interest to the present discussion are disturbances of the RRO variety, which as mentioned above can arise from a number of sources such as disc slippage and servo data location errors. Prior art approaches to compensating for such RRO effects have typically involved the evaluation of the PES over a number of disc revolutions to generate a series of compensation values which are then stored in a compensation table and thereafter fed forward into the servo loop during operation. This approach is exemplified by U.S. Pat. No. 4,594,622 issued to Wallis and U.S. Pat. No. 5,539,714 issued to Andrews et al. While operable, such an approach becomes increasingly difficult to implement for higher performance drives. The use of adaptive tables resident in memory imposes a latency cost to access and retrieve a value for each servo sample (e.g., at each servo interrupt). This cost becomes increasingly burdensome at higher servo sample rates and with the compensation of larger numbers of harmonics.

Accordingly, there remains a continued need for improvements in the art to compensate for repeated runout position error in a disc drive servo system, and it is to such improvements that the present invention is directed.

SUMMARY OF THE INVENTION

The present invention is directed to an apparatus and method for compensating repeated (persistent) runout position error in a disc drive data handling system.

In accordance with preferred embodiments, the disc drive handling system includes an actuator assembly having an actuator arm which supports a head adjacent a recording surface. A servo circuit includes a servo controller which controls position of the head in response to a position error signal indicative of position of the head with respect to the recording surface.

The servo circuit further includes a filter operably coupled in parallel with the servo controller to receive the position error signal and to generate a compensation signal to reduce the effects of the repeated runout head position error. The compensation signal is based on the position error signal and a frequency of rotation of the recording surface.

The filter is configured to provide a notch in an error sensitivity function relating the position error signal to the repeated runout position error, with the notch being nominally centered at the desired attenuation frequency, such as a multiple of the spindle motor rotation frequency. The filter advantageously operates to calculate the compensation signal values on-the-fly, thereby eliminating the need to store and retrieve different compensation values in memory for each position error signal sample over a complete rotation of the recording surface. Thus, the filter is capable of providing compensation at higher servo sample rates and for larger numbers of harmonics without latency and access costs associated with the prior art.

These and various other features as well as advantages which characterize the present invention will be apparent from a reading of the following detailed description and a review of the associated drawings.

DETAILED DESCRIPTION

Figure 1:
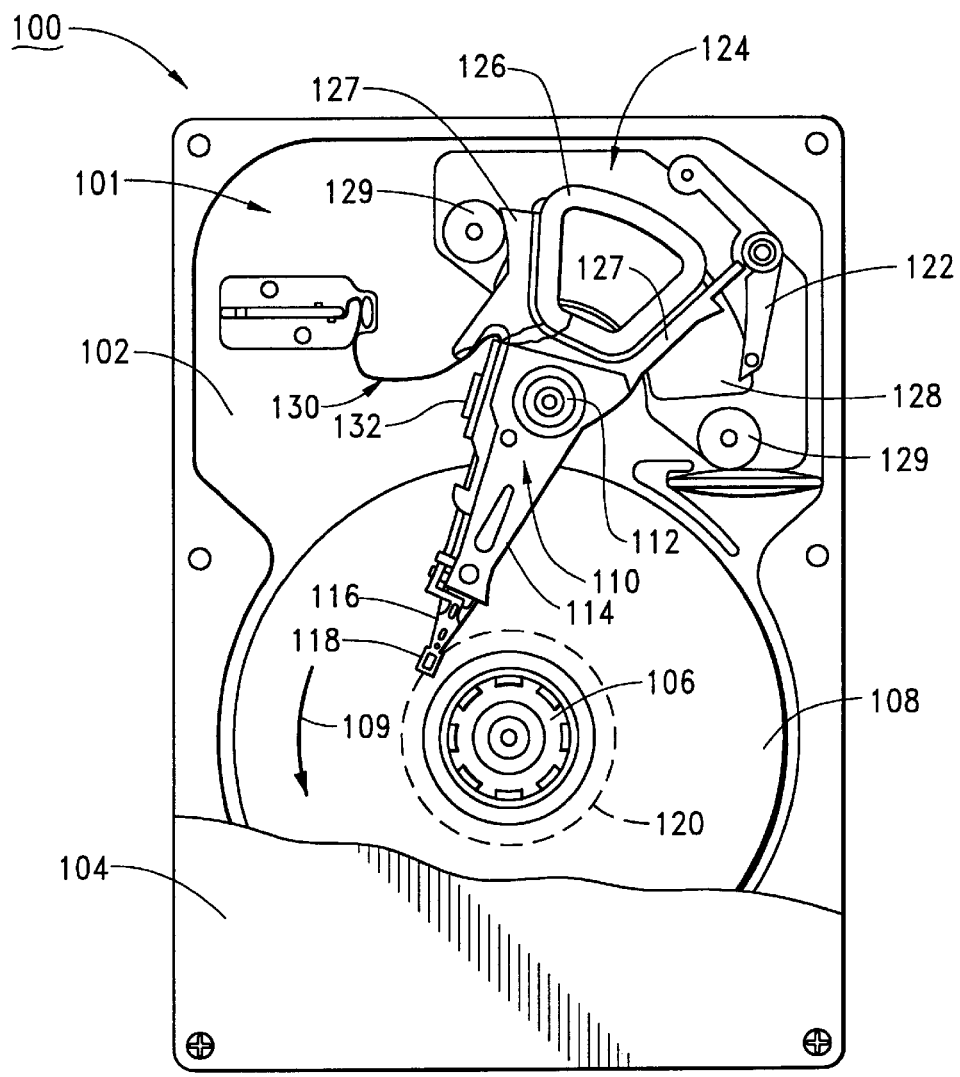
FIG. 1 is a top plan view of a disc drive constructed in accordance with preferred embodiments of the present invention.

Referring to the drawings in general, and more particularly to FIG. 1, shown therein is a top view of a disc drive data handling system 100 (hereinafter "disc drive") constructed in accordance with preferred embodiments of the present invention. It will be understood that the disc drive 100 is merely exemplary in nature and the present invention can be practiced with other data handling systems having numerous variations in construction and operation as compared to the exemplary system of FIG. 1.

The disc drive 100 includes a head/disc assembly (HDA) 101 which houses various mechanical components of the disc drive 100, and a disc drive printed circuit board assembly (PCBA) which supports various electronic communication and control circuits. The PCBA is affixed to the underside of the HDA 101 and is therefore not visible in FIG. 1.

The HDA 101 includes a base deck 102 which, in cooperation with a top cover 104 (shown in partial cut-away), forms an internal housing for the disc drive 100. A spindle motor 106 rotates a number of recording discs 108 in an angular direction indicated at 109. An actuator 110 rotates about a cartridge bearing assembly 112 and includes a number of rigid actuator arms 114 which support flexible suspension assemblies (flexures) 116. The flexures, in turn, support a corresponding number of read/write heads 118 adjacent the respective disc recording surfaces.

When the disc drive is deactivated, the heads 118 are brought to rest upon texturized landing zones 120 and the actuator 110 is secured using a latch 122. During operation, the actuator 110 is rotated by a voice coil motor (VCM) 124 comprising an actuator coil 126 supported by coil support arms 127 adjacent a permanent magnet 128. Compliant limit stops 129 limit the angular extent of actuator travel and serve to protect the actuator from damage. A flex circuit assembly 130 provides communication paths for the actuator 110 and includes a preamplifier/driver circuit (preamp) 132.

Figure 2:
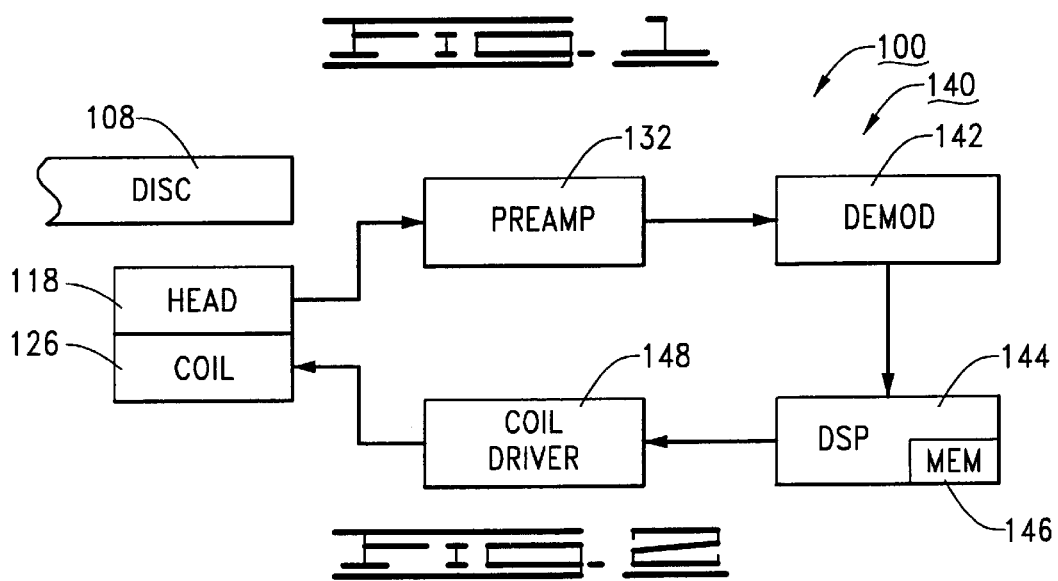
FIG. 2 provides a functional block diagram for a servo circuit of the disc drive of FIG. 1.

FIG. 2 provides a functional block diagram of a servo control circuit 140 (also referred to as "servo circuit" and "servo loop") used to provide closed loop positional control of the actuator 110. Servo position data in the form of radially displaced servo fields written to the discs during disc drive manufacturing are transduced by a selected head 118, preamplified by the preamp 132 and provided to a demodulation circuit (demod) 142 which conditions the data for use by a digital signal processor (DSP) 144.

The DSP 144 generates a position error signal (PES) indicative of head position and outputs a current correction signal to a coil driver circuit 148 to adjust the current applied to the coil 126, and hence, the position of the selected head 118. The DSP 144 operates in accordance with commands from a top level disc drive processor (not shown) and programming steps provided in DSP memory (MEM) 146. The DSP 144 performs seeks to move the head from one track to another, and track following operations to cause the head to follow a selected track.

Figure 3:
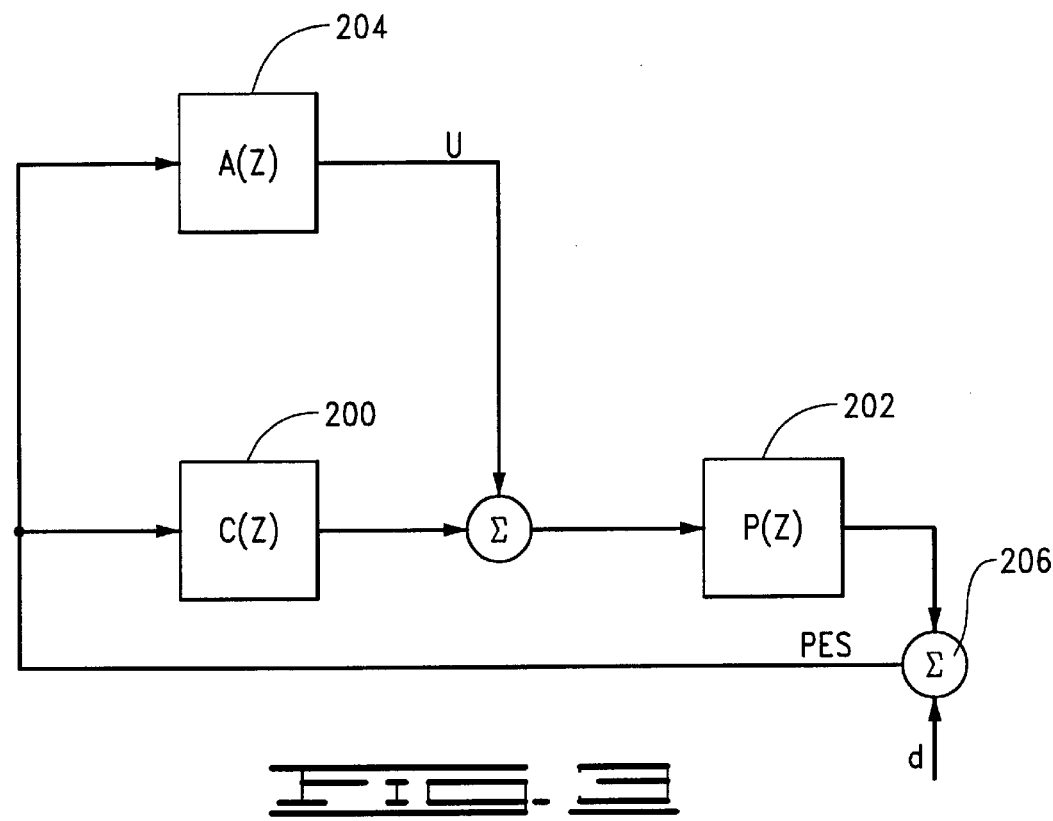
FIG. 3 is a control diagram of the servo circuit of FIG. 2 including a filter block configured in accordance with preferred embodiments to compensate for repeated runout (RRO) position error.

FIG. 3 provides a control block diagram for the servo circuit 140 of FIG. 2 in accordance with preferred embodiments of the present invention. The diagram includes a controller block C(z) 200, plant block P(z) 202, and filter block A(z) 204. The controller 200 represents that portion of the DSP operation that operates to generate current command signals during track following. The plant 202 describes remaining portions of the servo circuit 140, including coil driver 148, coil 126, head 118, preamp 132 and demodulator 142, and generates position error signal (PES) samples which are provided as inputs to the controller 200 and filter 204. The filter 204 preferably comprises a digital filter constructed and operated as discussed below to remove repeated runout (RRO) position error from the PES. At this point it will be noted that the filter 204 is advantageously implemented in programming (firmware) used by the DSP 144, but can alternatively be implemented in hardware as desired.

To understand the manner in which the filter 204 is constructed and operated, it will first be convenient to consider the eccentricity of a track induced, for example, from disc slippage or servo data location error, as a disturbance signal d injected into the PES as shown at summing junction 206. The filtered cancellation signal from the filter 204 is denoted as cancellation signal u and serves to remove the effects of the disturbance from the loop.

The disturbance will be contemplated as having selected amplitude and phase characteristics, and can be expressed in accordance with the following relationship:

$$d_0(k) = D(k)\cos(\omega_0 kT + \theta(k)) \qquad (1)$$

where k is the sampling index, D is the amplitude of the disturbance, $\omega_0$ is the frequency of the disturbance, T is the sampling period and $\theta$ is the phase of the disturbance. Using this relationship, the digital value of the feedforward control signal can be represented as follows:

$$u(k) = a(k)\cos(\omega_0 kT) + b(k)\sin(\omega_0 kT) \qquad (2)$$

It will be noted that the present discussion contemplates a single-input, single-output (SISO) discrete time stochastic system, but it will be understood that the invention is also applicable to other system configurations. Transfer functions and signals are expressed in the discrete time domain using the time index, k, and the unit delay operators $q^{-1}$ and $z^{-1}$.

Figure 4:
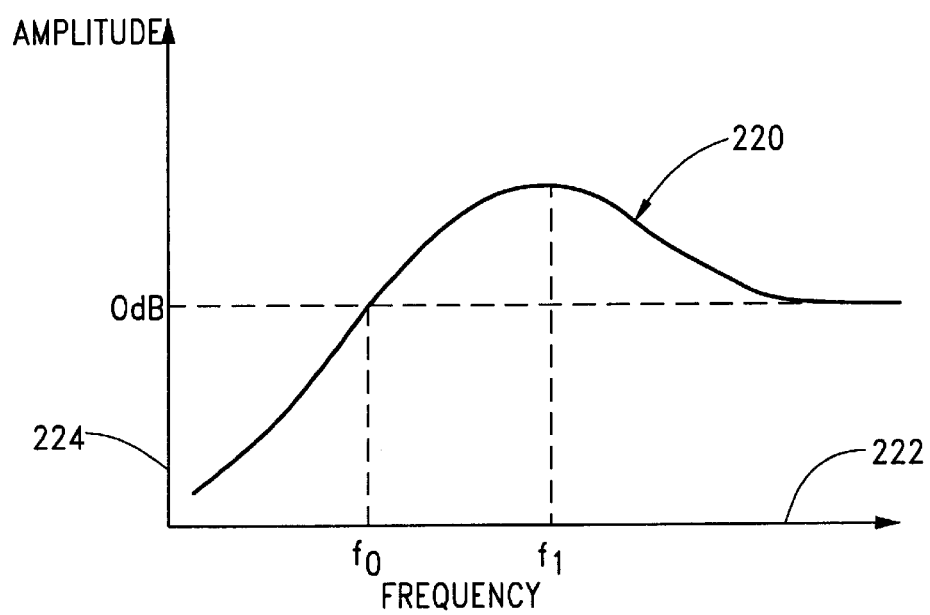
FIG. 4 is graphical representation of an error sensitivity function for the servo loop of FIG. 3 without the filter block.

FIG. 4 shows a graphical representation of an error sensitivity function S (curve 220) as a function of disturbance frequency f. The curve 220 is plotted against frequency x-axis 222 and amplitude (dB) y-axis 224. The error sensitivity function S relates the magnitude of the position error signal (PES) arising from the disturbance to the magnitude of the disturbance itself. The error sensitivity function can be generally expressed as:

$$S(q^{-1}) = \frac{PES(q^{-1})}{d_0(q^{-1})} \qquad (3)$$

From FIG. 4 it will be noted that below a frequency $f_0$ the value of the error sensitivity function S is below 0 dB, and above the frequency $f_0$, S is above 0 dB. Thus, below $f_0$ the magnitude of the RRO disturbance is attenuated in the PES, and above $f_0$ the disturbance is magnified in the PES. The value of the error sensitivity function S is at a maximum at a frequency $f_1$, above which the value of the function reduces to 0 dB again. From FIGS. 3 and 4, the PES can be represented as follows:

$$PES(k)=S(q^{-1})d_0(k)-S(q^{-1})P(q-1)u(k) \quad (4)$$

Figure 5:
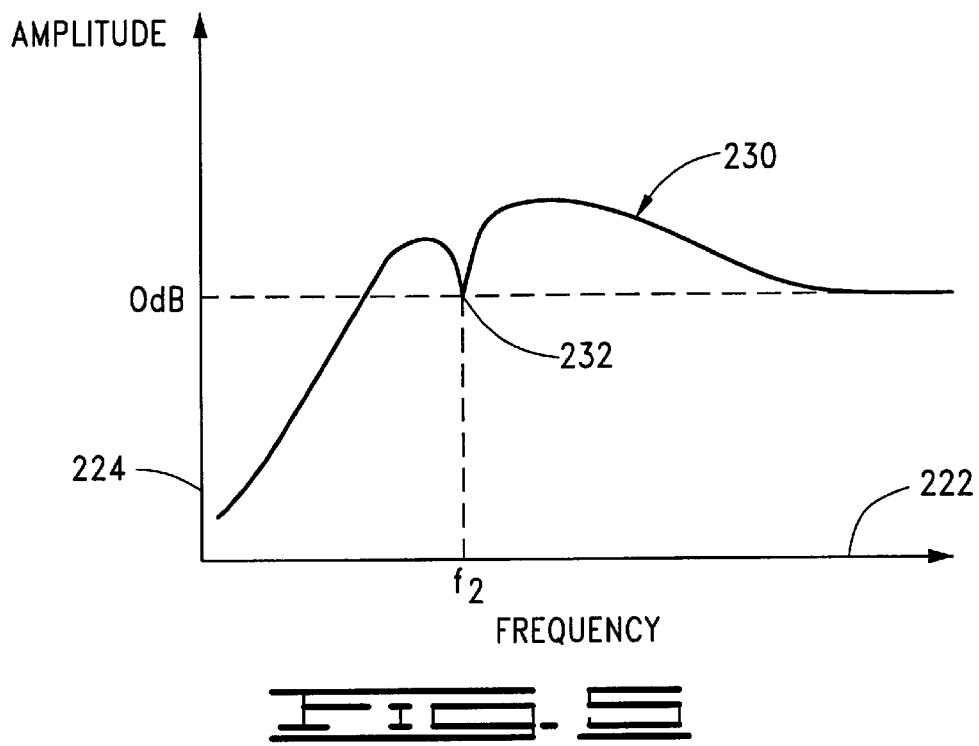
FIG. 5 shows the error sensitivity function of FIG. 4 with a notch introduced by the filter block of FIG. 3.
Figure 6:
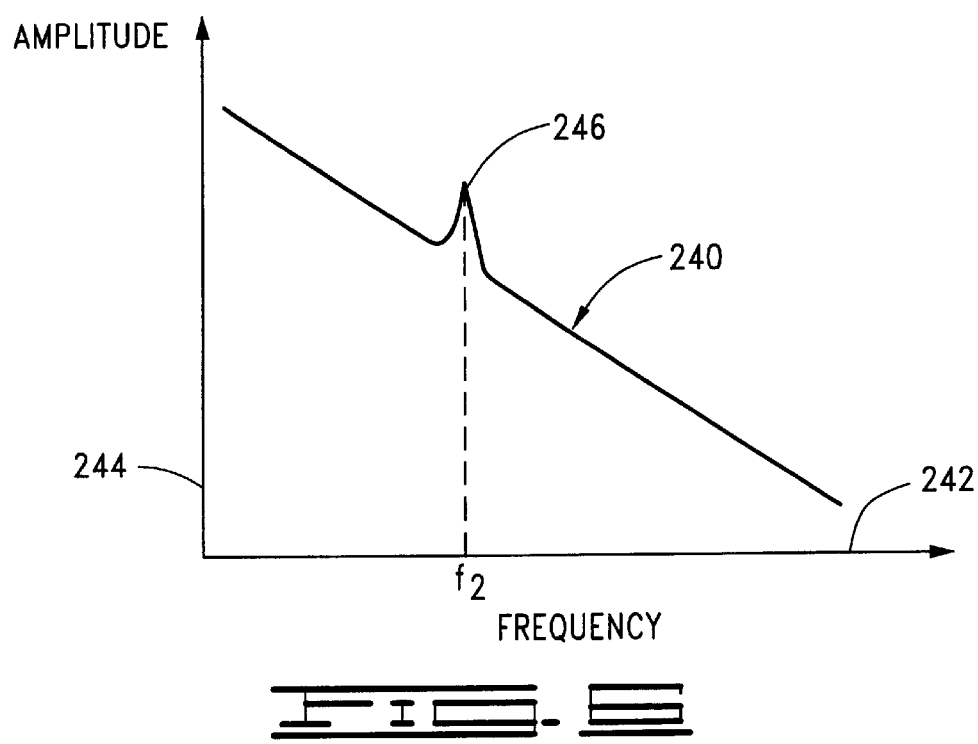
FIG. 6 provides a graphical representation of open loop gain of the servo loop of FIG. 3 with a peak corresponding to the notch of FIG. 5.

In accordance with preferred embodiments, the filter 204 places one or more notches in the error sensitivity function S to remove the effects of RRO disturbances. FIG. 5 provides a graphical representation of another error sensitivity function S (curve 230, plotted against axes 222, 224) with a notch 232 implemented at frequency $f_2$. The notch is designed to filter out (decrease) the effect of the disturbance on the PES at the frequency $f_2$. FIG. 6 provides a corresponding open loop gain curve 240 (plotted against frequency x-axis 242 and gain L y-axis 244). The error sensitivity function S is related to the open loop gain L of the servo loop by the following relation:

$$S(q^{-1}) = \frac{1}{1+L(q^{-1})} \quad (5)$$

The notch 232 in the error sensitivity function S in FIG. 5 results in a corresponding spike 246 in the open loop gain function of FIG. 6 at the same frequency.
Using the gradient of steepest descent and normalization of the quadrature sine input vector, the normalized least means square (NLMS) update law computes the terms a(k) and b(k) for each PES sample as follows:

$$a(k+1) = a(k) + \frac{\mu_0}{\alpha}\cos(\omega_0 kT + \theta)PES(k) \quad (6)$$

$$b(k+1) = b(k) + \frac{\mu_0}{\alpha}\sin(\omega_0 kT + \theta)PES(k) \quad (7)$$

where $$0 < \mu_0 < 4 \quad (8)$$

$$\alpha = |P(e^{j\omega T})S(e^{j\omega T})|_{\omega=\omega_0} \quad (9)$$

$$\phi = arg\{P(e^{j\omega T})S(e^{j\omega T})\}|_{\omega=\omega_0} \quad (10)$$

with $\mu_0$ comprising a convergence factor representing the learning rate and controlling the width of the notch produced in the error sensitivity function S. The value $\alpha$ represents the magnitude of the nominal closed loop gain of the servo loop, and the value $\phi$ represents the phase response of the nominal closed loop gain of the servo loop. The parameters $\alpha$ and $\phi$ are determined by measuring the frequency response of the servo loop (in the presence of the disturbance, as discussed below) and then used as a priori knowledge to provide a loop matching effect. The resulting NLMS update law of Equations (6) and (7) exhibits dependable exponential convergence of the parameters a(k) and b(k). Prior art runout cancellation filters do not employ such loop matching, and can therefore be prone to divergence for larger learning rates. The normalizing of the learning rate with $\alpha$ results in a consistent convergence rate for any targeted frequency $\omega_0$. A larger $\mu_0$ allows better tracking of A(k) and $\theta$(k).

It has been determined that the filter described above, appearing to be adaptive-nonlinear-time-varying, in fact provides a second-order, linear, time-invariant (LTI) system. This linear, time-invariant system can be described by the following relation:

$$A(z) = \frac{u_{ff}}{PES} = \frac{z^2\left[\frac{\mu_0}{\alpha}\cos(\phi)\right] - z\left[\frac{\mu_0}{\alpha}\cos(\phi+\omega_0 T)\right]}{\frac{z^2}{\eta} - z[2\cos(\omega_0 T)] + \eta} \quad (11)$$

where

A(z) is the response of the filter section;

z is the z transform;

$\omega_0$ is the frequency of the notch;

$\eta$ controls the depth of the notch;

$\mu_0$ controls the width of the notch;

$\alpha$ is a gain parameter indicative of the gain of the servo loop at $\omega_0$;

$\phi$ is a phase advance parameter indicative of the phase response of the servo loop at $\omega_0$, and T is the sampling period.

Like the parameters $\omega_0$, $\alpha$ and $\phi$, the parameter $\eta$ is determined by measuring the frequency response of the servo loop and is used as a priori knowledge. For example, while spindle induced RRO will typically exist at one primary resonant frequency (i.e., the disc rotation rate), additional filter sections can be used as desired to account for harmonics (i.e., multiples of the disc rotation rate) as well as other RRO effects such as servo data location errors.

The open-loop gain of the servo circuit with the filter 204 can be represented as:

$$L(z)=P(z)C(z)+P(z)A(z) \quad (12)$$

and the error sensitivity function expressed as a feed forward sensitivity function can be represented as:

$$S_{ff}(z) = \frac{1}{1+P(z)C(z)+P(z)A(z)} \quad (13)$$

The filter 204 implemented using equation (11) is a stabilizing peaking filter. It is scalable because it can be deployed at substantially any frequency including near or at crossover frequencies. Because of the loop matching effect, equation (11) reliably provides a notch on the error transfer function S at the desired frequency $\omega_0$.

In an illustrative embodiment, the filter 204 includes a table (not separately shown) that stores the parameters $\alpha$, $\phi$, $\mu$, $\eta$ and $\omega$ for each head which are then used as each new head is selected in turn. While the filter primarily improves track following, it is contemplated that the filter can remain active during seeks as well.

Figure 7:
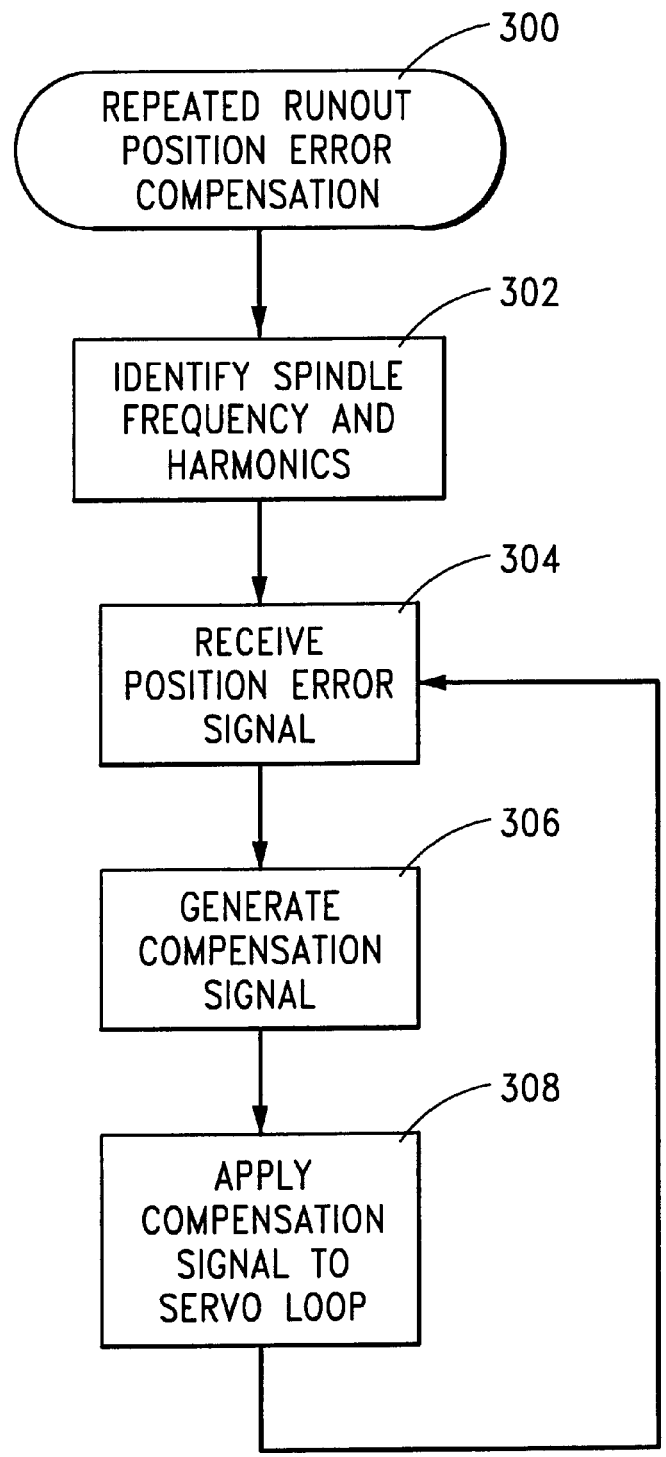
FIG. 7 provides a flow chart for a REPEATED RUNOUT POSITION ERROR COMPENSATION routine to set forth steps carried out in accordance with preferred embodiments of the present invention to remove the effects of RRO error during track following operations.

FIG. 7 provides a flow chart for a REPEATED RUNOUT POSITION ERROR COMPENSATION routine 300, illustrative of steps carried out in accordance with preferred embodiments of the present invention to compensate for RRO errors during operation.

At step 302, the spindle frequency is identified, as well as the number of spindle frequency harmonics (multiples) for which compensation is desired. For example, a disc rotational speed of nominally 10,800 revolutions per minute would provide a primary frequency of 180 Hz. Disc slippage in such case would generally result in the addition of a 180 Hz frequency component in the PES. Once the frequency or frequencies to be compensated are identified, an associated number of filter stages (as set forth by equation (11)) are provided and the filter parameters ($\alpha$, $\phi$, $\mu$, $\eta$) are then selected for each stage over one or more revolutions. As discussed above, these parameters are selected by measuring frequency response of the closed servo loop are used as a priori knowledge to provide loop matching and consistent convergence rate for any targeted frequency $\omega_0$. Such operation can occur during manufacturing or subsequent field use. Moreover, the parameters can be selected and later adjusted based on empirical evaluation of PES characteristics over time.

Thereafter, during disc drive operation as shown by step 304, a PES is generated (as a sequence of digital samples at the sampling rate of the servo loop) and a compensation signal is generated at step 306 based on the PES as well as the frequencies identified in step 302. The compensation signal is then injected into the servo loop 308, such as by combination with the current command signals generated by the controller 200 as shown in FIG. 3. The disc drive 100 continues such operation for each successive PES sample, as indicated by the looping back of the routine to step 304.

In summary, one embodiment of the present invention is directed to a method for reducing repeated runout position error for a head 118 supported adjacent a recording surface 108 of a data handling system 100, comprising steps of: identifying a frequency of rotation of the recording surface, and configuring a filter 204 to provide a notch 232 in an error sensitivity function 230 relating position error signal to repeated runout position error, wherein the notch is nominally centered at the frequency of rotation of the recording surface (step 302); receiving a position error signal sample having a component of the repeated runout position error (step 304); using the filter to filter the position error signal sample to generate a compensation signal sample configured to remove the component of the repeated runout position error without the use of different compensation values stored in memory for each position error signal sample over a complete rotation of the recording surface (step 306); and applying the compensation signal to the servo loop (step 308).

In accordance with a further embodiment, the compensation signal is generated in accordance with the following relation:

$$A(z) = \frac{\mu_{ff}}{PES} = \frac{z^2\left[\frac{\mu_0}{\alpha}\cos(\phi)\right] - z\left[\frac{\mu_0}{\alpha}\cos(\phi + \omega_0 T)\right]}{\frac{z^2}{\eta} - z[2\cos(\omega_0 T)] + \eta}$$

where $u_{ff}$ is the compensation signal, PES is the position error signal, z is the z transform, $\omega_0$ is the frequency of the notch, $\eta$ controls the depth of the notch, $\mu_0$ controls the width of the notch, $\alpha$ is a gain parameter indicative of the gain of the servo loop at $\omega_0$, $\phi$ is a phase advance parameter indicative of the phase response of the servo loop at $\omega_0$, and T is a sampling period.

The present invention is further directed to a data handling system 100 including a recording surface 108 on which a plurality of nominally concentric tracks are defined and an actuator assembly 110 comprising an actuator arm 114 which supports a head 118 adjacent the recording surface. A servo circuit 140 includes a servo controller 200 which controls position of the head in response to a position error signal indicative of position of the head with respect to the recording surface. The servo circuit further includes a filter 204 operably coupled in parallel with the servo controller to receive the position error signal and to generate a compensation signal to reduce effects of repeated runout head position error. The compensation signal is based on the position error signal and a frequency of rotation of the recording surface. The filter is configured to provide a notch in an error sensitivity function relating the position error signal to the repeated runout position error, wherein the notch is nominally centered at the frequency of rotation of the recording surface. The filter advantageously operates without the use of different compensation values stored in memory for each position error signal sample over a complete rotation of the recording surface.

In a further embodiment, the filter 204 is a second order, linear time-invariant (LTI) filter configured as discussed above.

For purposes of the appended claims, it will be understood that the function of the claimed "means for canceling repeated runout head position error . . ." is carried out by the disclosed filter 204 which operates in accordance with the flow chart of FIG. 7 and includes filter stages configured as set forth by equation (11). It will further be understood that prior art structures such as disclosed by the aforementioned U.S. Pat. Nos. 4,594,622 and 5,539,714 rely on compensation values stored in memory for each position error signal sample over a complete revolution of a recording surface and therefore are incapable of performing the claimed invention, and are moreover explicitly excluded from the definition of an equivalent to the foregoing structure.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a data handling system which uses an actuator assembly to support a head adjacent a recording surface and a servo loop which generates a position error signal to controllably position the head, a method for reducing repeated runout position error comprising error in the position of the head that is repeated over each revolution of the recording surface, comprising steps of:

(a) identifying a frequency of rotation of the recording surface;

(b) configuring a filter to provide a notch in an error sensitivity function relating the position error signal to the repeated runout position error, wherein the notch is nominally centered at the frequency of rotation of the recording surface;

(c) receiving a position error signal sample having a component of the repeated runout position error;

(d) using the filter configured in step (b) to filter the position error signal sample to generate a compensation signal sample configured to remove the component of the repeated runout position error without the use of different compensation values stored in memory for each position error signal sample; and (e) applying the compensation signal to the servo loop.

2. The method of claim 1, wherein the compensation signal is generated in accordance with the following relation:

$$A(z) = \frac{\mu_{\mathit{ff}}}{PES} = \frac{z^2\left[\frac{\mu_0}{\alpha}\cos(\phi)\right] - z\left[\frac{\mu_0}{\alpha}\cos(\phi + \omega_0 T)\right]}{\frac{z^2}{\eta} - z[2\cos(\omega_0 T)] + \eta}$$

where $u_{\mathit{ff}}$ is the compensation signal, PES is the position error signal, z is the z transform, $\omega_0$ is the frequency of the notch, $\eta$ controls the depth of the notch, $\mu_0$ controls the width of the notch, $\alpha$ is a gain parameter indicative of the gain of the servo loop at $\omega_0$, $\phi$ is a phase advance parameter indicative of the phase response of the servo loop at $\omega_0$, and T is a sampling period.

3. The method of claim 2, wherein the configuring step (b) includes determining values for the parameters $\alpha$ and $\phi$ by measuring frequency response of the servo loop and using the values as a priori knowledge to produce a loop matching effect that provides a substantially consistent convergence rate for any target frequency $\omega_0$.

4. The method of claim 1, wherein the applying step (e) comprises steps of generating a current command signal based on the position error signal indicative of current to be applied to an actuator motor to adjust head position, combining the current command signal with the compensation signal to generate a modified current command signal, and applying the modified current command signal to the actuator motor.

5. A data handling system, comprising:
a recording surface on which a plurality of nominally concentric tracks are defined;
an actuator assembly comprising an actuator arm which supports a head adjacent the recording surface; and
a servo circuit coupled to the actuator assembly, comprising:
a servo controller which controls position of the head in response to a position error signal indicative of position of the head with respect to the recording surface; and
a filter, operably coupled in parallel with the servo controller to receive the position error signal and to generate a compensation signal based on the position error signal and a frequency of rotation of the recording surface, the compensation signal adapted to cancel a component of the position error signal arising from said rotation of the recording surface to thereby reduce repeated runout head position error, the filter configured to provide a notch in an error sensitivity function relating the position error signal to the repeated runout position error, wherein the notch is nominally centered at the frequency of rotation of the recording surface, and wherein the filter operates without the use of different compensation values stored in memory for each position error signal sample.

6. The data handling system of claim 5, wherein the servo circuit further comprises:
a demodulator which generates the position error signal in response to servo data transduced by the head from the recording surface; and
a motor driver which applies current to an actuator motor to move the actuator arm, wherein the servo controller generates a current command signal which is combined with the compensation signal to generate a modified current command signal which is used by the motor driver to apply current to the actuator motor.

7. The data handling system of claim 5, wherein the servo circuit determines the frequency of oscillation by abruptly accelerating and decelerating the actuator arm to subject the actuator arm to a broad spectrum excitation, and measuring the oscillation of the actuator arm resulting from said excitation.

8. The data handling system of claim 5, wherein the filter comprises a second order, linear time-invariant filter with a trigonometric function based transfer function.

9. The data handling system of claim 5, further comprising a plurality of recording surfaces and associated heads, wherein the filter is configured differently for each head to independently compensate repeated runout head position error associated with each of the recording surfaces.

10. The data handling system of claim 5, wherein the compensation signal is generated in accordance with the following relation:

$$A(z) = \frac{\mu_{\mathit{ff}}}{PES} = \frac{z^2\left[\frac{\mu_0}{\alpha}\cos(\phi)\right] - z\left[\frac{\mu_0}{\alpha}\cos(\phi + \omega_0 T)\right]}{\frac{z^2}{\eta} - z[2\cos(\omega_0 T)] + \eta}$$

where $u_{\mathit{ff}}$ is the compensation signal, PES is the position error signal, z is the z transform, $\omega_0$ is the frequency of the notch, $\eta$ controls the depth of the notch, $\mu_0$ controls the width of the notch, $\alpha$ is a gain parameter indicative of the gain of the servo loop at $\omega_0$, $\phi$ is a phase advance parameter indicative of the phase response of the servo loop at $\omega_0$, and T is a sampling period.

11. The data handling system of claim 10, wherein values for the parameters $\alpha$ and $\phi$ are determined by measuring frequency response of the servo loop and using the values as a priori knowledge to produce a loop matching effect that provides a substantially consistent convergence rate for any target frequency $\omega_0$.

12. A data handling system, comprising:
an actuator assembly comprising an actuator arm which supports a head adjacent tracks defined on a recording surface; and
means for canceling repeated runout head position error in a position error signal used to control head position by generating a compensation signal without the use of different compensation values stored in memory for each position error signal sample over a complete rotation of the recording surface.

13. The data handling system of claim 12, wherein the means for canceling repeated runout head position error comprises a servo circuit coupled to the actuator assembly, the servo circuit comprising:
a servo controller which controls position of the head in response to a position error signal indicative of position of the head with respect to the recording surface; and
a filter, operably coupled in parallel with the servo controller to receive the position error signal and to generate a compensation signal based on the position error signal and a frequency of rotation of the recording surface, the compensation signal adapted to cancel a component of the position error signal arising from said rotation of the recording surface to thereby reduce repeated runout head position error, the filter configured to provide a notch in an error sensitivity function relating the position error signal to the repeated runout position error, wherein the notch is nominally centered at the frequency of rotation of the recording surface, and wherein the filter operates without the use of different compensation values stored in memory for each position error signal sample over a complete rotation of the recording surface.

14. The data handling system of claim 13, wherein the servo circuit further comprises:

a demodulator which generates the position error signal in response to servo data transduced by the head from the recording surface; and a motor driver which applies current to an actuator motor to move the actuator arm, wherein the servo controller generates a current command signal which is combined with the compensation signal to generate a modified current command signal which is used by the motor driver to apply current to the actuator motor.

15. The data handling system of claim 13, wherein the servo circuit determines the frequency of oscillation by abruptly accelerating and decelerating the actuator arm to subject the actuator arm to a broad spectrum excitation, and measuring the oscillation of the actuator arm resulting from said excitation.

16. The data handling system of claim 15, wherein the filter comprises a second order, linear time-invariant filter with a trigonometric function based transfer function.

17. A method comprising measuring a frequency response of a servo loop to generate a loop matching effect that provides a substantially consistent convergence rare for any target notch frequency of an adjustable notch filter used to reduce servo error.

18. The method of claim 17, wherein the loop marching effect is generated by steps comprising:

measuring a frequency response of a servo loop to determine a gain value of the servo loop along with a phase response value of the servo loop at an identified notch frequency; and using the gain value and the phase response value as a priori knowledge to produce a loop matching effect that provides a substantially consistent convergence rate for any target notch frequency of an adjustable filter to reduce servo error.

* * * * *